J. B. KEATING.
LIQUID SEALING BOX.
APPLICATION FILED FEB. 3, 1916.
1,211,166.
Patented Jan. 2, 1917.
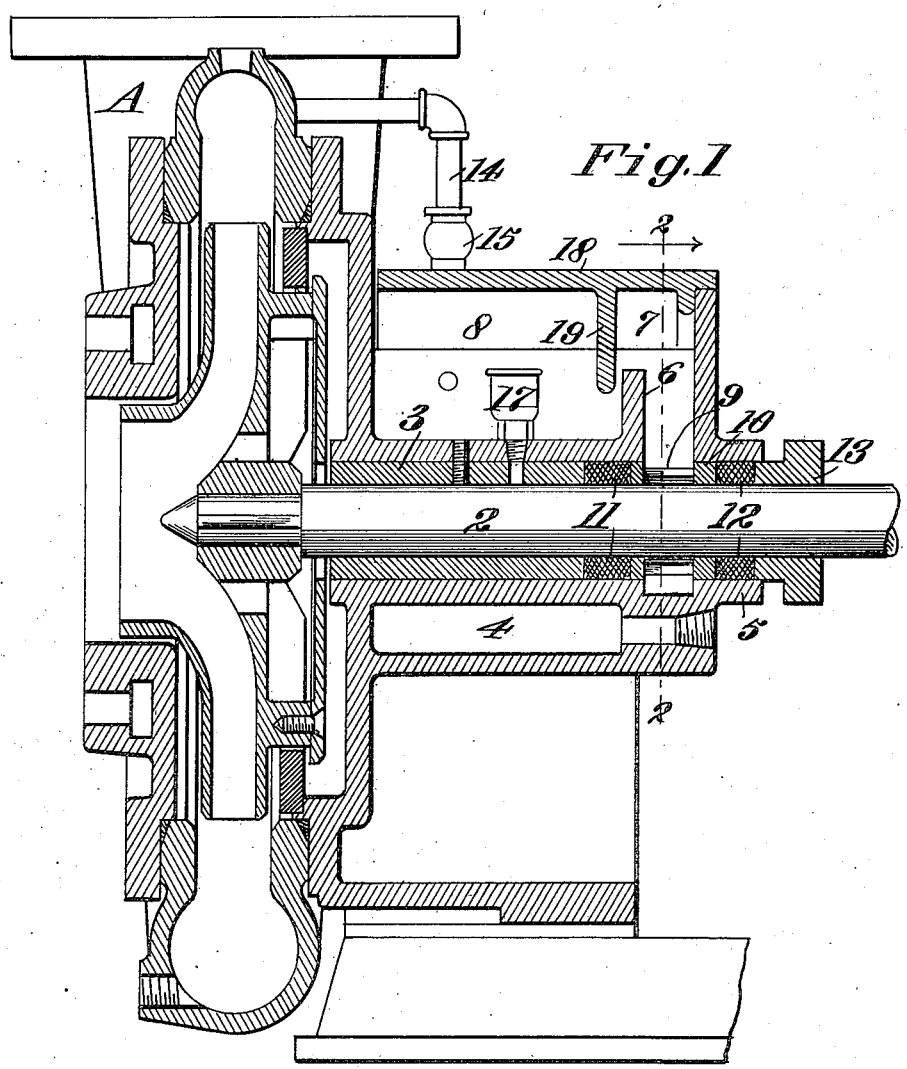
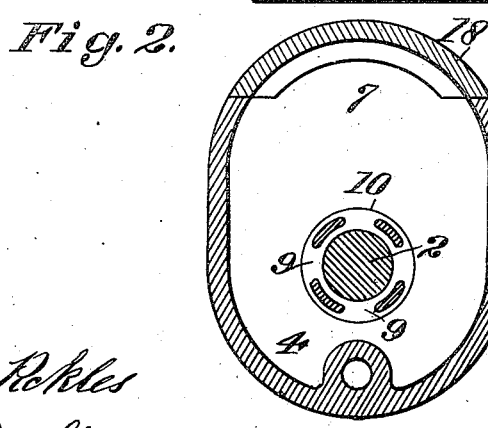
WITNESSES:
Charles Rokles
B. M. Doolin
INVENTOR
John B. Keating
BY Strong & Townsend
ATTORNEYS

UNITED STATES PATENT OFFICE.

JOHN B. KEATING, OF OAKLAND, CALIFORNIA, ASSIGNOR TO BYRON JACKSON IRON WORKS, OF WEST BERKELEY, CALIFORNIA, A CORPORATION OF CALIFORNIA.

LIQUID-SEALING BOX.

1,211,166.  Specification of Letters Patent.  Patented Jan. 2, 1917.

Application filed February 3, 1916. Serial No. 75,982.

*To all whom it may concern:*

Be it known that I, JOHN B. KEATING, a citizen of the United States, residing at Oakland, in the county of Alameda and State of California, have invented new and useful Improvements in Liquid - Sealing Boxes, of which the following is a specification.

This invention relates to a liquid sealing box, particularly adapted for use with centrifugal pumps to prevent breaking the vacuum within the pump by the entry of air around the impeller shaft.

One of the objects of the present invention is to provide an economical and safe means for liquid-sealing stuffing boxes on centrifugal pumps, or like machinery, having rotating or reciprocating shafts, and at the same time to maintain the pump bearing entirely immersed in liquid for the purpose of cooling; also to provide means for settling the sand or grit contained in the liquid to prevent said particles from entering the stuffing box and cutting the shaft.

Further objects will hereinafter appear.

The invention consists of the parts and the construction and combination of parts as hereinafter more fully described and claimed, having reference to the accompanying drawings, in which—

Figure 1 is a side elevation of a pump, partly in section, showing the application of the invention. Fig. 2 is a cross section on line 2—2 of Fig. 1.

Referring to the drawings in detail, A indicates in general a pump casing, 2 the shaft, and 3 the main bearing through which the shaft extends and which is usually provided with a stuffing box to prevent admission of air into the casing. Cast integrally with the rear pump cover and the bearing 3 is a liquid sealing box 4, which is provided for the purpose of forming a chamber surrounding the main bearing which may be filled with water or oil for maintaining the bearing cool and also for the purpose of forming a seal for the stuffing box, generally indicated at 5.

Within the box 4 and cast integrally with same is a partition member 6 which divides the box into two compartments 7 and 8. The larger compartment 8 forms a settling chamber while the compartment 7 is an overflow chamber, from which water or oil may be admitted to the stuffing box proper through a communicating opening 9 and a cage ring or lantern gland 10. This gland is interposed between the packing in the stuffing box, thus dividing the packing into two sections 11 and 12. The packing 11 prevents admission of air to the pump, while the packing 12 prevents the sealing liquid from leaking out around the shaft 2. Any suitable form of exterior gland 13 may be provided to hold the cage ring and interposed packing in place.

Where water is used for sealing purposes a pipe 14, connected with the pump volute or discharge, may be employed. A valve 15, mounted on its lower end, may be opened from time to time to fill the chamber 8. Any sand or grit contained in the water is thus given an opportunity to settle in this chamber and will gradually rise to the top of the dividing wall 6 which is somewhat lower than the outer walls of the sealing box proper, and will then overflow into the second chamber 7, filling this completely and thereby providing the necessary sealing water for the stuffing box and bearing. It will not only prevent air from being drawn into the pump through the bearing 3, to break or reduce the vacuum created by the impeller, something very much to be guarded against, but it will overcome the troubles usually encountered where a packing is employed, as the water enters the packing through the lantern gland 10 and maintains this in a thoroughly saturated condition.

The water-sealing chamber is open slightly to the atmosphere, between the casing A and the inner end of the plate 18 and is not under pressure; hence, a minimum amount of water is necessary to accomplish the water-sealing, and packing troubles are almost entirely eliminated, as very little packing is required, which is at all times thoroughly saturated. Hence the waste of power, due to tight stuffing boxes and hot bearings, is done away with.

The sealing box is provided with a cover 18 to exclude or prevent admission of dust and like objectional material, and a baffle member 19 is also provided to prevent any floating substance from overflowing into compartment 7.

The present construction provides a liquid sealing box cast as an integral part of the pump cover on the shaft side and, furthermore, provides a stuffing box, a lantern gland and double sets of packing, one on the inside of the lantern gland to prevent the admission of air to the pump and one on the outside to prevent leakage of the sealing liquid. The lantern gland permits the sealing liquid to intimately surround the shaft where it is exposed to the communicating opening 9, thus permitting the packing to be thoroughly saturated at all times.

Where water is employed for sealing purposes a grease cup, such as indicated at 17, may be employed. The bearing will, therefore, receive water and part grease lubrication, as shown. This cup may, however, be entirely eliminated where oil is used as a sealing liquid. Oil has in several instances proved more desirable as it is easier to pack against and does not evaporate as rapidly as the water.

Having thus described my invention what I claim and desire to secure by Letters Patent is—

1. In a centrifugal pump, the combination with the casing, impeller shaft and shaft bearing, of a liquid sealing box surrounding the shaft and bearing and divided into two compartments, one constituting a settling chamber and the other a sealing chamber with an overflow from the settling chamber to the sealing chamber.

2. In a centrifugal pump, the combination with the casing, impeller shaft and shaft bearing, of a liquid sealing box surrounding the shaft and bearing and divided into two compartments, one constituting a settling chamber and the other a sealing chamber with an overflow from the settling chamber to the sealing chamber, and fluid connections between the settling chamber and the pump discharge for replenishing the settling chamber.

3. In a centrifugal pump, the combination with the casing, impeller shaft and shaft bearing, of a liquid sealing box surrounding the shaft and bearing and divided into two compartments, one constituting a settling chamber and the other a sealing chamber with an overflow from the settling chamber to the sealing chamber, a cover for the box having a downwardly extending submergible baffle member coöperating with the overflow partition between the two chambers.

4. The combination with a pump shaft and its bearing, of a liquid sealing box surrounding the bearing, a stuffing box in the outer end of the bearing, a partition member dividing the box into a settling chamber and an overflow chamber, and means for admitting liquid from the overflow chamber into the stuffing box.

5. The combination with a pump shaft and its bearing, of a liquid sealing box surrounding the bearing, a stuffing box in the outer end of the bearing, a partition member dividing the box into a settling chamber and an overflow chamber, a lantern gland interposed between the packing in the stuffing box, and means for admitting liquid from the overflow chamber to the lantern gland.

In testimony whereof I have hereunto set my hand in the presence of two subscribing witnesses.

JOHN B. KEATING.

Witnesses:
 JOHN H. HERRING,
 W. W. HEALEY.